US012777086B2

(12) United States Patent
Hegar et al.

(10) Patent No.: US 12,777,086 B2
(45) Date of Patent: Oct. 27, 2026

(54) MANAGING TRANSCODING RESOURCES IN CONTENT DELIVERY SYSTEMS

(71) Applicant: Amazon Technologies, Inc., Seattle, WA (US)

(72) Inventors: Ryan Hegar, Happy Valley, OR (US); Timur Kiykioglu, Portland, OR (US); Kevin Moore, Portland, OR (US); John Saxton, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 760 days.

(21) Appl. No.: 17/657,726

(22) Filed: Apr. 1, 2022

(65) Prior Publication Data

US 2022/0337652 A1 Oct. 20, 2022

Related U.S. Application Data

(63) Continuation of application No. 16/217,645, filed on Dec. 12, 2018, now Pat. No. 11,297,124.

(51) Int. Cl.

| | |
|---|---|
| ***H04L 65/70*** | (2022.01) |
| ***G06F 9/455*** | (2018.01) |
| ***H04L 65/61*** | (2022.01) |
| ***H04L 65/612*** | (2022.01) |
| ***H04L 65/80*** | (2022.01) |

(52) U.S. Cl.

CPC .............. *H04L 65/70* (2022.05); *H04L 65/61* (2022.05); *G06F 9/45504* (2013.01); *G06F 9/45558* (2013.01); *G06F 2009/4557* (2013.01); *G06F 2009/45591* (2013.01); *H04L 65/612* (2022.05); *H04L 65/80* (2013.01)

(58) Field of Classification Search

CPC ....... H04L 65/70; H04L 65/61; H04L 65/612; H04L 65/80; G06F 9/45504; G06F 9/45558; G06F 2009/4557; G06F 2009/45591

See application file for complete search history.

(56) References Cited

U.S. PATENT DOCUMENTS

| | | | | |
|---|---|---|---|---|
| 8,813,245 | B1 * | 8/2014 | Corley .................... | G06F 21/10 709/229 |
| 8,982,942 | B2 * | 3/2015 | Gao ..................... | H04N 19/147 370/254 |
| 9,875,134 | B2 | 1/2018 | Gabrielson et al. | |
| 11,297,124 | B1 | 4/2022 | Hegar et al. | |
| 2006/0023067 | A1 | 2/2006 | Yang | |
| 2006/0168006 | A1 | 7/2006 | Shannon et al. | |

(Continued)

*Primary Examiner* — Michael W Ayers

(74) *Attorney, Agent, or Firm* — Knobbe, Martens, Olson & Bear, LLP

(57) ABSTRACT

A content delivery service that facilitates the selection of virtual machine instances utilized to implement the transcoding function. A management service first implements a test channel configuration routine that selects worst case scenario configurations for implementing the transcoding function and measures performance metrics for different virtual machine instances implementing the transcoding function. The management system can then match incoming requests for video channel transcoding with signature data from the test channel configurations to identify which virtual machine instances can implement the requested transcoding functionality.

22 Claims, 7 Drawing Sheets

(56) References Cited

U.S. PATENT DOCUMENTS

| | | | | |
|---|---|---|---|---|
| 2008/0052381 | A1 | 2/2008 | Yu | |
| 2010/0042747 | A1* | 2/2010 | Hascalovici | H04L 67/303 709/246 |
| 2012/0307886 | A1 | 12/2012 | Agarwal et al. | |
| 2013/0049998 | A1 | 2/2013 | English et al. | |
| 2015/0143363 | A1 | 5/2015 | Gombert et al. | |
| 2016/0070601 | A1 | 3/2016 | Yamamoto et al. | |
| 2016/0103697 | A1 | 4/2016 | Bragstad et al. | |
| 2016/0234506 | A1* | 8/2016 | Wang | H04N 19/436 |
| 2016/0306673 | A1* | 10/2016 | You | G06F 9/5044 |
| 2017/0168729 | A1* | 6/2017 | Faulkner | G06F 3/0613 |
| 2017/0199752 | A1* | 7/2017 | Cao | G06F 11/3409 |
| 2019/0158274 | A1 | 5/2019 | Tormasov et al. | |
| 2020/0068002 | A1* | 2/2020 | Cheung | H04L 67/60 |

* cited by examiner

MANAGING TRANSCODING RESOURCES IN CONTENT DELIVERY SYSTEMS

CROSS-REFERENCE TO RELATED APPLICATIONS

This application is a continuation of U.S. patent application Ser. No. 16/217,645, now U.S. Pat. No. 11,297,124, entitled MANAGING TRANSCODING RESOURCES IN CONTENT DELIVERY SYSTEMS BY COMPARING SIGNATURES OF TRANSCODING REQUESTS WITH SIGNATURES OF TEST CHANNEL CONFIGURATIONS, and filed on Dec. 12, 2018, the entirety of which is incorporated herein by reference.

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a video packaging and origination service provider. As with content providers, video packaging and origination service providers also provide requested content to client computing devices often with consideration of efficient transmission of the requested content to the client computing device and/or consideration of a cost associated with the transmission of the content. Accordingly, video packaging and origination service providers often consider factors such as latency of delivery and resource allocation in providing requested content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
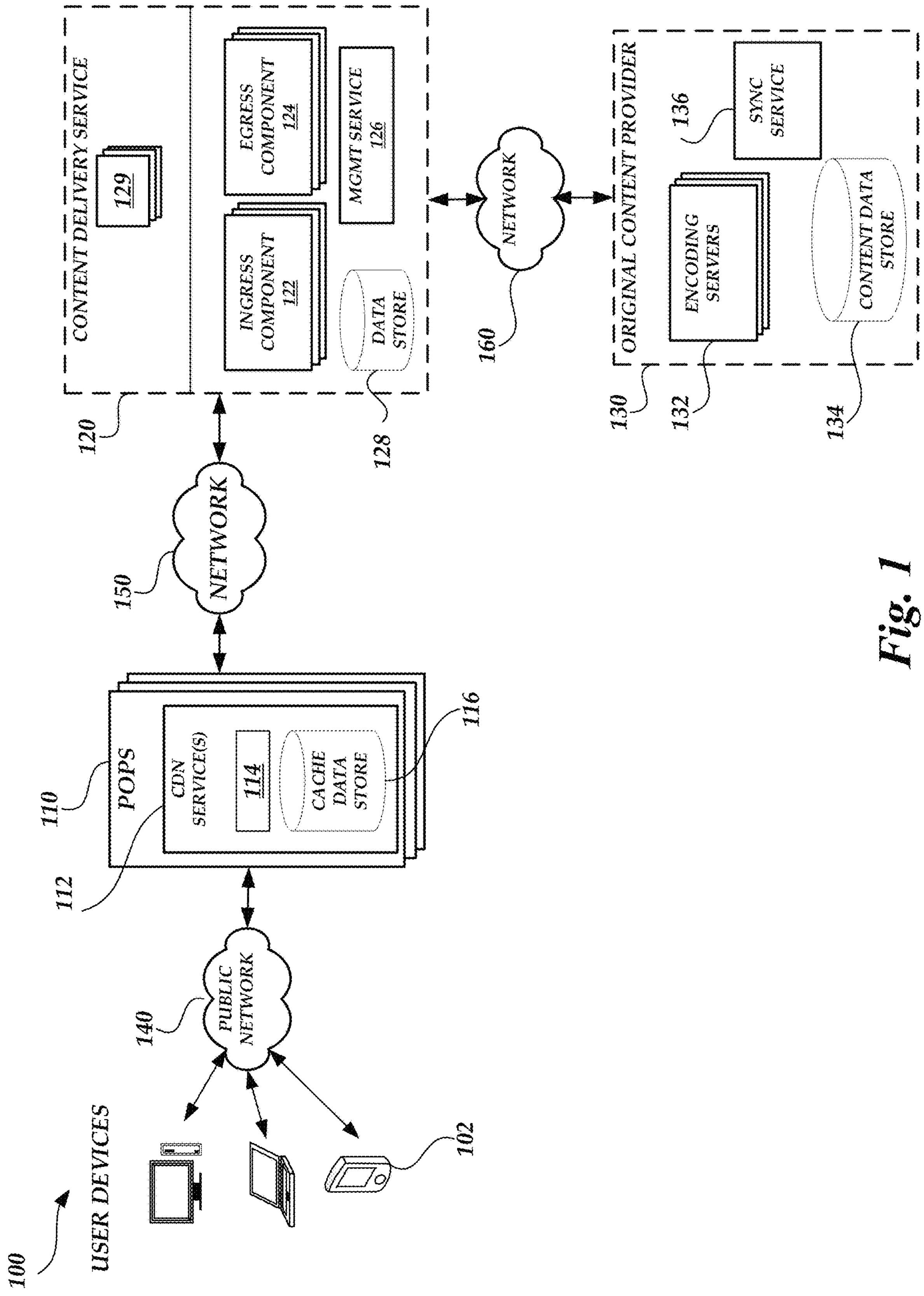
FIG. 1 is a block diagram of a content delivery environment that includes one or more user devices, a video packaging and origination service and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

In some embodiments, to deliver content, content providers can organize requested content, such as a video file, into multiple segments that are then transmitted to requesting devices, segment by segment. For example, in a video stream, each segment typically accounts for 2-10 seconds of video rendered on a receiving device. To provide content to the video packaging and origination service, individual content segments can be encoded by an encoder and transmitted to the video and origination service. Traditionally, a single processing node on the video packaging and origination service can receive an incoming stream of encoded segments or original encoded content for further processing.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, video packaging and origination services can maintain a one or more nodes or servers, e.g., an ingress node, to receive incoming encoded content streams and decode the source encoded content. More specifically, the single node can operate as an ingress node to receive individual content streams or channels corresponding to source encoded segments encoded to a specific encoding profile (e.g., encoding bitrate and format). The individual content streams or channels are provided by an original content provider. The ingress node can utilize state information that facilitates determination that all encoding versions of the same encoded segment have been received.

To support adaptive bitrate encoding or streaming, the ingress node decodes the source encoded content into an unencoded format. Thereafter, the unencoded content is encoded by one or more nodes or servers functioning as egress nodes, or encoders, that can process the decoded source content into one or more of the encoded content versions that will be available to requesting users. When a single node or server implements the functionality of both an ingress and egress node, the node can be referred to as a transcoding node that decoders incoming encoded content and generates one or more encoded content formats from the decoded original encoded content signal. Accordingly, reference to transcoding functionality can include decoding encoded original content, encoding previously decoded original content, or a combination thereof.

In some implementations, a content provider can implement transcoding functionality in one or more nodes implemented on virtual machine instances hosted by a service provider. Typically, service providers offer different types or configurations of virtual machine instances in terms of available computing resources, including processing resources, memory resources, network bandwidth resources, and the like. Some virtual machine instances types or configurations are not operable to support transcoding functionality or implementing transcoding functionality in a manner to meet minimum service level performance. Additionally, selecting a highest level of virtual machine type or configuration, in terms of available computing resources, is often inefficient, especially when lower levels of virtual machine instance types or configurations are operable to implement the transcoding functionality in a manner meeting or exceeding minimum service level performance. Still further, a simple brute force measurement of all possible virtual machine configurations/parameters is difficult to produce and inefficient to maintain.

To address at least a portion of the inefficiencies described above with regard to processing of encoded content from content provider, aspects of the present application correspond to content delivery service that can receive and process encoded content streams from a content provider. The content delivery service facilitates the selection of computing devices, such as virtual machine instances, utilized to implement transcoding functionality. A management service first implements a test channel configuration routine that selects attributes associated with transcoding functionality that represents "worst case" scenario configurations for implementing the transcoding functionality. Such configurations can include, but is not limited to, specification of values related to resolution of content to be encoded, a frame rate of content to be encoded, an encoding codec, or an encoding file type. The "worst case" scenario represents values that likely require the greatest consumption of computing device resources to execute the transcoding functionality. The management service measures performance metrics for different computing devices that are available to implement the transcoding functionality and stores the information as a set of virtual machine instances compatible with a signature of the test channel configuration. The signature of the test channel configuration corresponds to the attributes of the content encoded in the test channel configuration. The management system can then match incoming channel requests for transcoding with the signature data from the test channel configurations. Based on a matching signature, the management system can then select or identify computing devices, such as a virtual machine instance, can implement the requested transcoding functionality.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and content delivery service 120 are depicted as having a single connection to the network 140, individual components of the client computing devices 102 and content delivery service 120 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number or combination of networks.

In accordance with embodiments, for purposes of illustration, the content delivery service 120 includes one or more servers for receiving content from original content providers 130 and processing the content to make available a set of received encoded bitrate segments. The components of the content delivery service 120 may provide the encoded content to a separate stand-alone service, such as video packaging and origination service, for subsequent transmission to user devices 102 or a CDN service 110. In other embodiments, the illustrated components of the content delivery service 120 may be integrated or form a part of a video packaging and origination service. Accordingly, the term content delivery service 120 may be generally variable and is not limited to any particular implementation.

As described in further detail below, the content delivery service 120 includes a plurality of ingress components 122 utilized to receive encoded data streams from encoding servers 132 from content providers 130. Illustratively, the ingress components 122 can process the incoming encoded content from the original content providers 130. The content delivery service 120 also includes one or more egress components 124 encoding decoding content into a bitrate and format for delivery to user devices. Additionally, in some embodiments, at least some of the egress components 124 may be configured to utilize the encoded source content in lieu of encoding decoded source content, generally referred to as bypass encoding. The ingress components 122 and egress components 124 may be distributed according to geographic criteria or availability zones to facilitate delivery or access to encoded content. As previously described, the ingress components 122 or egress components 124 may be implemented in a combined node or virtual machine instance that implements transcoding functionality including the functionality of the ingress components, the egress components or a combination of both. Accordingly, reference to a virtual machine instance implementing transcoding functionality is not limited to any specific combination of decoding or encoding content.

The content delivery service 120 can further include management services 126 for testing a set of available virtual machine instances that are operable to implement transcoding functionality against one or more test channel configurations. The management services 126 can further process requests for processing incoming video from content providers and identifying a virtual machine instance type or configuration that should be instantiated responsive to the request and based on the previously conducted testing. Still further, the video packing and origination service 120 can include a plurality of cache components 129 that maintain encoded content in one or more distinct availability zones, such as different geographic areas or zones. Illustrative components of the management service 126 will be described with regard to FIG. 3. The content delivery service 120 can further include a data store 128 for maintaining received encoded data for transmission. The content delivery service 120 can further include additional components 129 such as a video packaging and origination service or other processing functionality that facilitates the streaming or transmission of encoded content to user devices 102.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices.

With continued reference to FIG. 1, the content delivery environment 100 also includes original content providers 130. Illustratively, the original content provider can include a plurality of encoders 132 for generating multiple encoded streams for transmission to the content delivery service 120. In one embodiment, individual encoders may generate different encode versions of a content segment according to a different encoding profile. The original content provider 130 can also include logic or other management components for determining how many encoders 132 should be utilized or how to manage the addition or removal of encoders. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The content delivery service 120 can further include a data store 134 for maintaining encoded data for transmission. The synchronization services 124 and 136 may work in conjunction or in a complimentary basis, such as to modify the encoding of source content utilized in bypass encoding embodiments.

Figure 2:
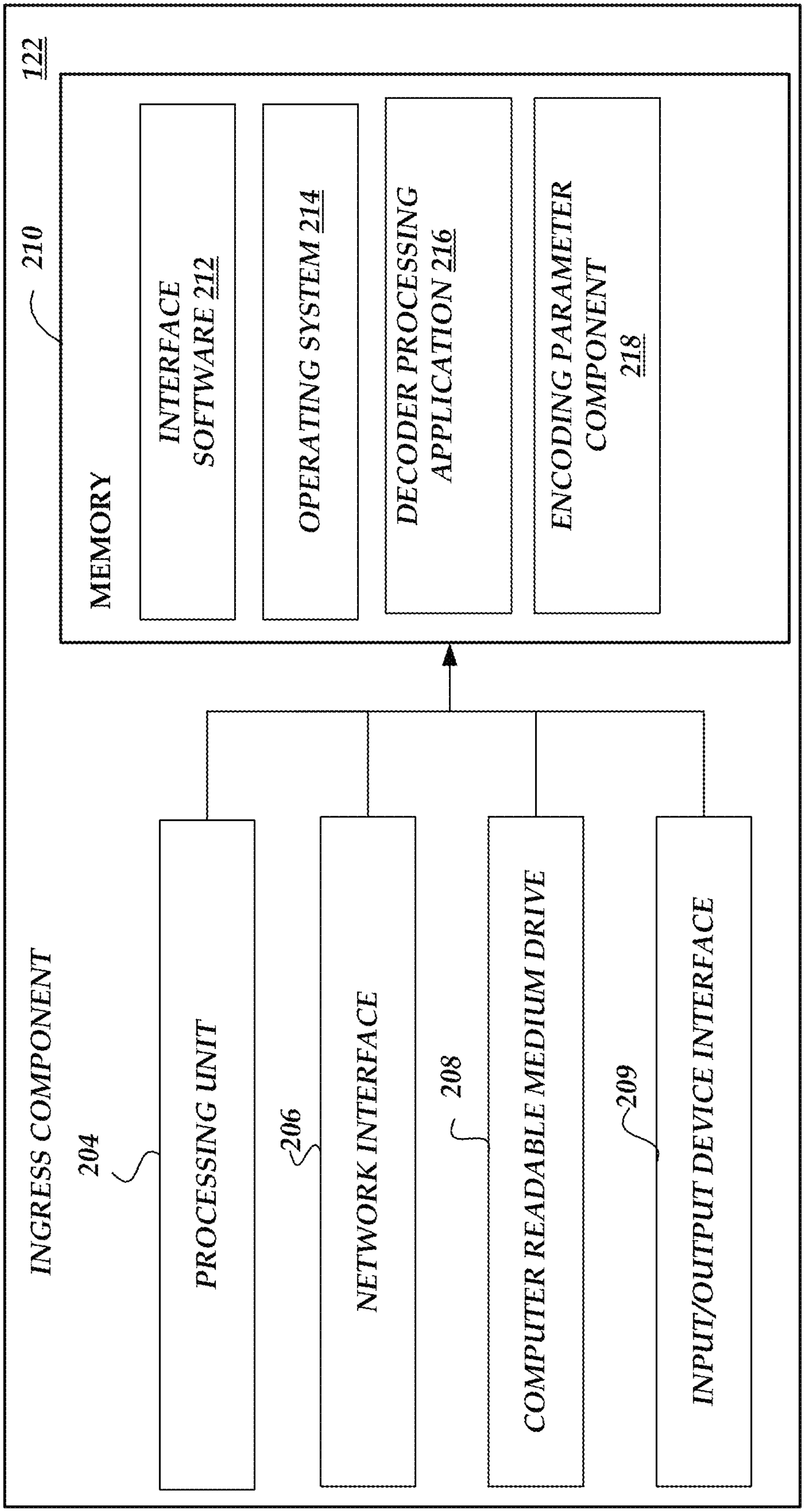
FIG. 2 is a block diagram of illustrative components of an ingress node configured to manage source encoding content in accordance with an illustrative embodiment.

FIG. 2 depicts one embodiment of an architecture of an illustrative server for functioning as transcoder node 200 implementing one or more of the functionality of an ingress component 122 or egress node 124 as described herein. As described above, the content delivery service 120 includes multiple ingress components 122 (or nodes) that facilitate intake of encoded segments from the original content provider 130 and egress components 124 that encode the decoded content to support adaptive bitrate encoding. The general architecture of the transcoding node 200 depicted in FIG. 2 includes an arrangement of computer hardware and software components that may be used to implement aspects of the present disclosure. As illustrated, the transcoding node 200 includes a processing unit 204, a network interface 206, a computer readable medium drive 208, an input/output device interface 209, all of which may communicate with one another by way of a communication bus. The components of the transcoding node 200 may be illustrative implemented in a virtualized environment. As will be explained in greater detail below, the selection of the underlying virtual machine instance type or configuration will be selected by the management service 126.

The network interface 206 may provide connectivity to one or more networks or computing systems, such as the network 150 or network 160 of FIG. 1. The processing unit 204 may thus receive information and instructions from other computing systems or services via a network. The processing unit 204 may also communicate to and from memory 210 and further provide output information for an optional display via the input/output device interface 209. In some embodiments, the transcoding node 200 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the ingress node. The memory 210 may further include computer program instructions and other information for implementing aspects of the present disclosure. For example, in one embodiment, the memory 210 includes interface software 212 for receiving and processing content. Additionally, the memory 210 includes a decoding processing application 216 for processing incoming encoded content segments and generating decoded content for subsequent encoding by one or more encoder processing applications. The memory 210 can further include an encoding processing application 218 for processing unencoded content and generating encoding content in accordance with one or more encoding formats and configurations.

Figure 3:
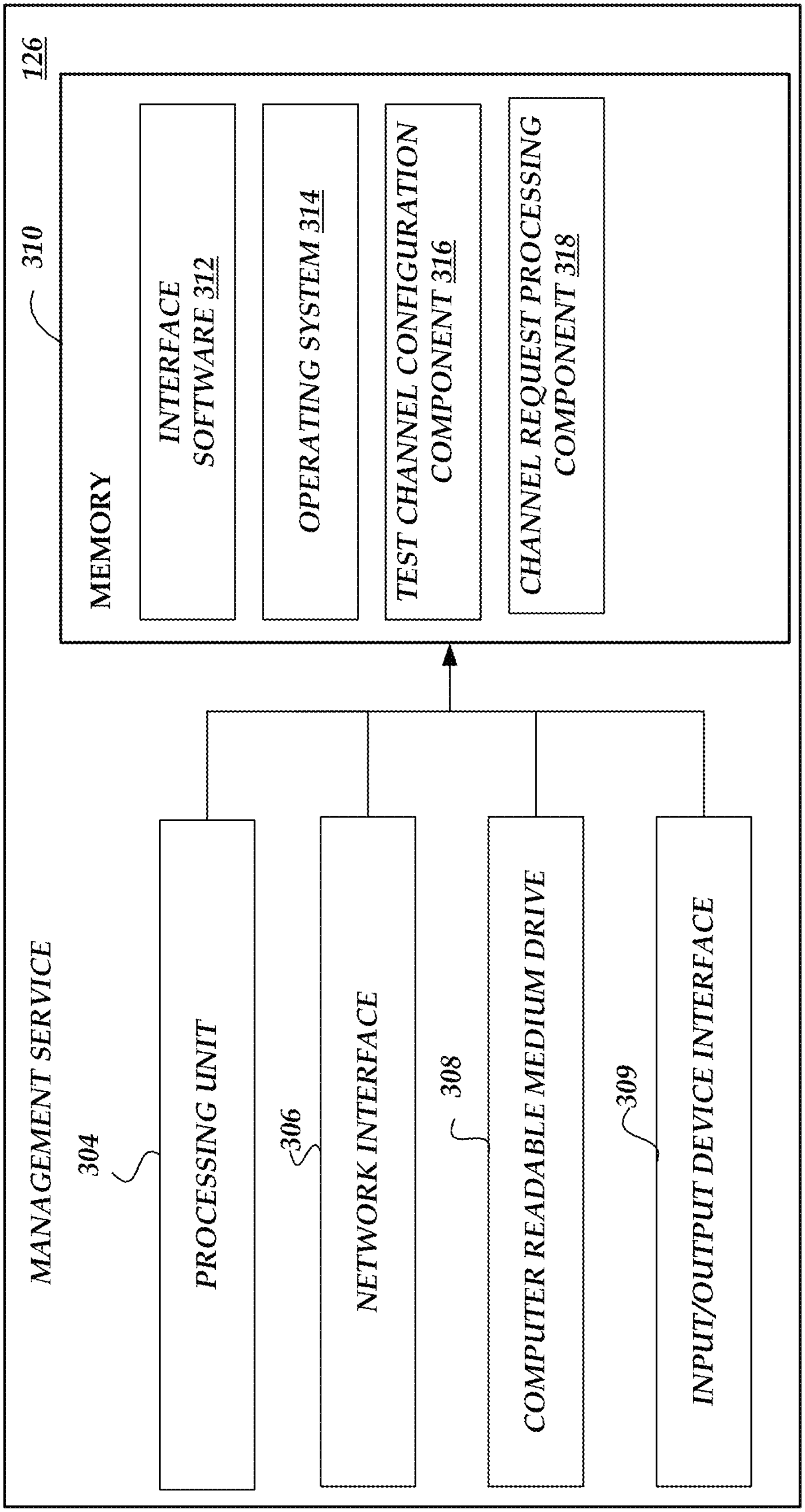
FIG. 3 is a block diagram of illustrative components of a management node configured to generate a set of compatible virtual machine instances and process channel request in accordance with illustrative embodiments.

FIG. 3 depicts one embodiment of an architecture of an illustrative server for functioning as a management service 126 as described herein. The general architecture of the management service 126 depicted in FIG. 3 includes an arrangement of computer hardware and software components that may be used to implement aspects of the present disclosure. As illustrated, the management service 126 includes a processing unit 304, a network interface 306, a computer readable medium drive 308, an input/output device interface 309, all of which may communicate with one another by way of a communication bus. The components of the egress component 124 may be physical hardware components or implemented in a virtualized environment.

The network interface 306 may provide connectivity to one or more networks or computing systems, such as the network 130 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the management service 126 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the egress component 124. The memory 310 may further include computer program instructions and other information for implementing aspects of the present disclosure. For example, in one embodiment, the memory 310 includes interface software 312 for receiving and processing content requests from requesting entities. Additionally, the memory 310 includes a test channel configuration component 316 for testing a set of available virtual machine instances according to a test channel configuration. Additionally, the management service 126 can further include a channel request processing component 318 for processing requests to process incoming requests by identifying a virtual machine instance type or configuration based on previously processed test channel configuration information.

Figure 4A:
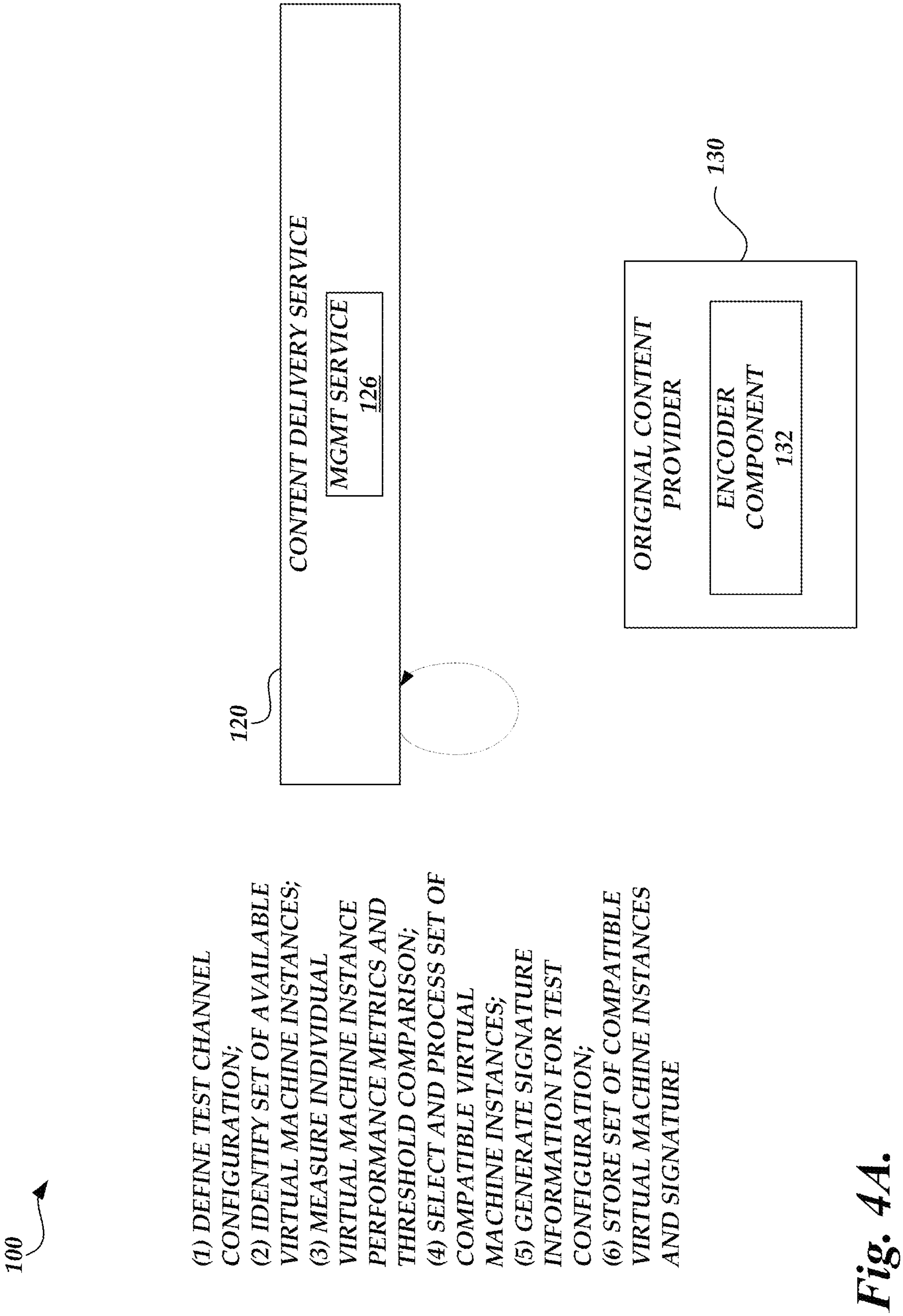
FIGS. 4A and 4B are block diagrams of the content delivery environment of FIG. 1 illustrating the generating of a set of compatible virtual machine instances and the processing of channel request in accordance with illustrative embodiments.
Figure 4B:
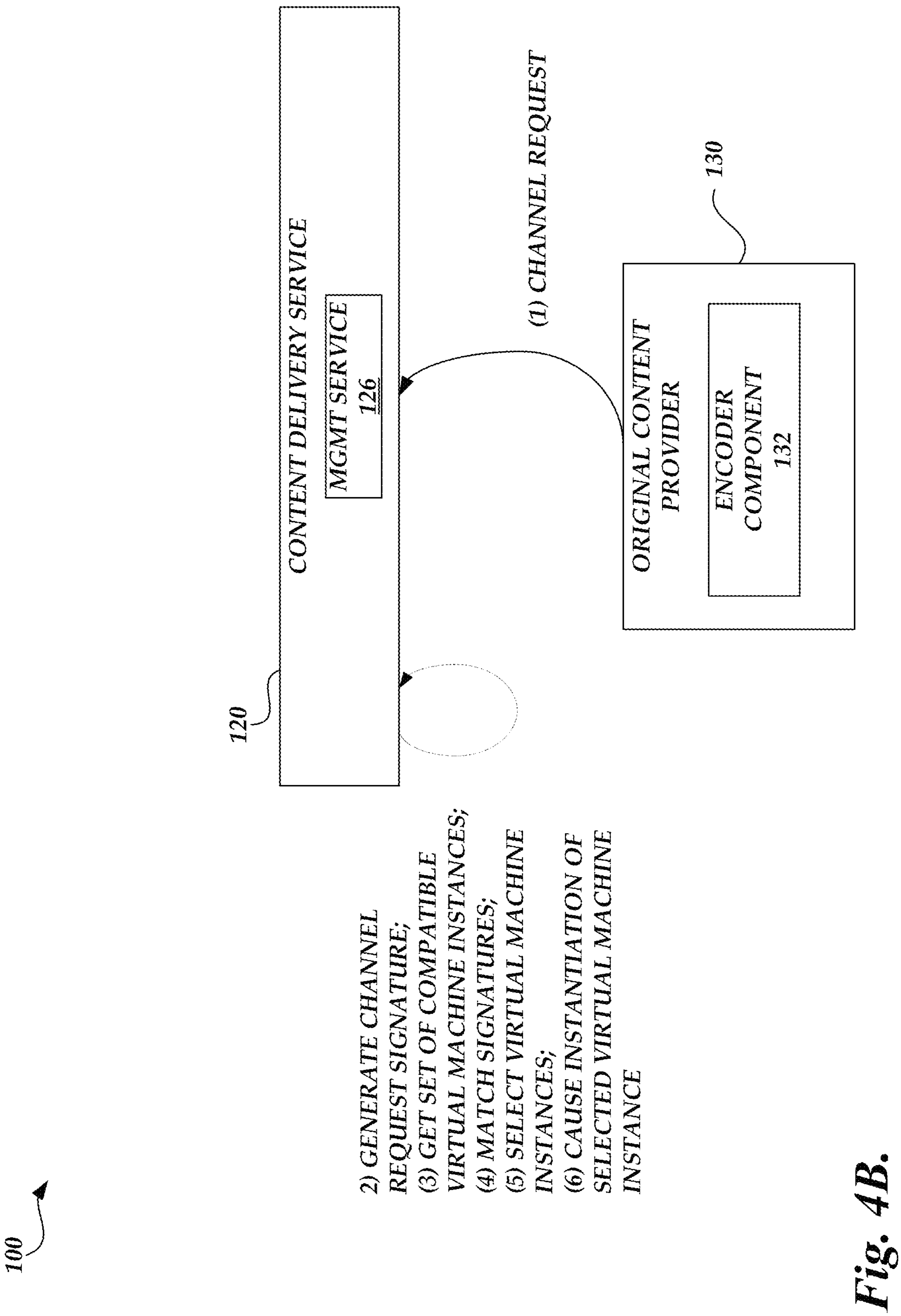

Turning now to FIGS. 4A and 4B, an illustrative interaction for the processing of encoded content from the original content provider 130 based on test channel configurations will be described will be described. With reference to FIG. 4A, at (1), the management service 126 defines test channel configuration parameters. Illustratively, channel configuration parameters correspond to the inputs to the content delivery service 120 that corresponds to all the user/customer specified settings for the processing of encoded content by the content delivery service, such as in a request to create a communication channel. Such test channel configurations can correspond to file types of content that can be encoded or settings/attributes of the of the transcoding functionality. For example, test channel configurations can include, but are not limited to resolution of content to be encoded, a frame rate of content to be encoded, or selection of an encoding codec. Accordingly, a test channel configuration corresponds to a set of attributes that may be characterized as affecting the implementation of the transcoding functionality by different computing device configurations, such as virtual machine types or virtual machine configurations.

In one aspect, to form the test channel configuration, the management service 126 can begin with obtaining or forming a channel request, such as from a historical channel request or manually created channel request. Illustratively, the channel request would include all the information typically included in a channel request, such as identifiers of the content, transcoding attribute configurations/values, destination information, and the like. Thereafter, the management service 126 remove or filter one or more channel request attributes or parameters that have not been characterized as affecting the implementation of the transcoding functionality. For example, the management service 126 can filter naming information or other organizational criteria that may not affect the transcoding functionality. In another example, the management service 126 can filter destination information or output processing information that will not or has been determined to not affect the transcoding functionality. The filtering process can utilize thresholding such that information that is associated with less than a threshold amount of effect/resource consumption can be filtered out.

In another aspect, the management service 126 can quantize one or more values of the channel configuration parameters. Typically, one or more attributes of the channel configurations (e.g., specified in the original channel request used as the basis of the test channel configuration) can be specified as a value in a range of possible values. For example, video bitrate values can be specified as a value in terms of a range of possible megabits per second ("Mbps"). In this aspect, the management service 126 can adjust the originally specified values by increasing or rounding up the value to a set value greater than the value specified in the original channel request. With reference to the previous example, the management service 126 can increase the specified bitrate to the nearest, higher 1 Mbps. In some embodiments, the set value may be sufficiently higher to encompass multiple embodiments/variations of the attribute. Additionally, the set value can also be limited such that the impact of performance between the set value and the original specified value does not significantly impact the measured performance metrics. The set values may be configured into default values or adjusted manually based on the tunable parameters.

In still a further aspect, the management service 126 adjust one or more of the channel configuration parameters according to a maximum value that represents a computationally worst-case scenario in terms of potential impact on virtual machine performance metrics. For example, the management service 126 can change an original setting for an encoding format and bitrate to a maximum value such that the test configuration parameters would represent that most computationally intensive formatting for implementation of transcoder functionality. In another example, the management service 126 can change a resolution parameter or a frame rate to a highest value. As described above, illustratively, the management service 126 can be configured with information that facilitates the identification of a range of possible configuration parameter values or settings that allows for the selection of "maximum values." In another example, the management service 126 can be configured with pre-determine "worst case" values for parameters or combinations of parameters that allows for selection and configuration.

At (2), the management service 126 identifies a set of available computing devices, such as a listing of physical computing devices or physical computing device configuration or virtual machine instances types or configurations that are operable to host transcoding functionality. Illustratively, a service provider can provide one or more virtual machine instance types or configurations that can be defined in terms of the computing resources that are available or other characteristics that define performance, cost or implementation. In some embodiments, the set of available virtual machine instance types/configurations may be further characterized by organizational criteria, such as a "family" of virtual machine instances, in which the virtual machine instances share one or more common parameters and may only be distinguished based on differences in one or two parameters. For example, a family of virtual machine instances may have a number of overlapping parameters in terms of hardware and software configurations, and may only differ based on the number of processing units or memory size (e.g., "small," "medium," "large," etc.). The set of available virtual machine instances may be the full set of virtual machine instances provided by a service provider. Alternatively, the set of virtual machine instances may be filtered or limited, such as by cost and the like. In other embodiments, the management service 126 can be configured with information identifying all the set of available computing devices, such as a listing of specific physical computing devices that are instantiated and configured by content provider 120.

At (3), the management service 126 collects performance metrics for the set of available computing devices, such as instantiated versions of the identified virtual machine instance types. In one embodiment, the collection and testing of computing devices can be implemented as an iterative loop. In other embodiments, the management service 126 may collect the performance metric information by testing two or more computing devices in parallel. Illustratively, to collect performance metric information, the management service 126 runs transcoder functionality according to the sample test configuration on the selected virtual machine instance. The management service 126 measures or obtains performance metrics for the selected virtual machine instance. Illustratively, the measured performance metrics can include, but are not limited to, a measure or characterization of CPU utilization, memory utilization, network bandwidth utilization, video quality, dropped frames, artifacts in encoding, error rates, and the like. Additionally, the management service 126 compares at least a portion of the collected performance metric information against minimum performance thresholds. Illustratively, the management service 126 can make a determination of positive or negative whether the virtual machine instance performance metrics meets or exceeds all of the performance thresholds. The management service 126 can include buffers in the thresholds for possible errors in measurement such that possible values within a determined range to the threshold may be considered as meeting the threshold (or in view of all other thresholds being satisfied). Alternatively, the management service 126 may treat the thresholds as absolute. The resulting comparison can correspond to an assessment of whether the virtual machine instance is capable of hosting transcoding functionality for the test channel configuration. In this regard, failure of any specific threshold or set of thresholds can correspond to an assessment that the computing device, such as a virtual machine instance type, is not capable of supporting the transcoding functionality for the test channel configuration. The management service 126 can further conduct multiple tests on the same computing device or virtual machine instance type to provide confidence values or verify previous testing.

Once all the virtual machine instances types/configurations have been tested and the computing device performance metric information has been collected and processed, at (4), the management service 126 selects the set of computing devices that are considered compatible with the test channel configuration. Illustratively, the set of computing devices considered compatible with the test channel configuration can include each individual virtual machine instance type/configuration that was tested by the management service 126 and was associated with performance metrics exceeding the minimum thresholds. Additionally, in some embodiments, the set of virtual machine instances can also include family members or other virtual machine instances associated by organizational criteria. For example, for a virtual machine instance meeting or exceeding performance thresholds, all "related" virtual machine instances with higher resource attributes could also be automatically included as well (e.g., a qualification of a size "small" would automatically qualify all virtual machine sizes). Similarly, the management service 126 can include physical computing devices that have the same (or substantially similar) configurations as a tested physical computing device (e.g., from a bank of physical computing devices having a same/similar configuration).

The management service 126 can optionally sort the set of compatible computing devices. In one aspect, the management service 126 can sort by one or more performance metrics, such that the virtual machine instances associated with higher performance metrics are ranked or prioritized. In another aspect, the management service 126 can sort by a financial cost associated or charged by the service provider such that the virtual machine instances can be identified from lower to higher attributed costs (or vice versa). In still other aspects, the management service 126 can accept additional, alternative or supplemental sorting criteria, such as custom criteria specified by a system administrator or the like.

At (5), the management service 126 generates signature information for the test channel configuration. Illustratively, the signature information corresponds to a representation of attributes of the test channel configuration that can be utilized to match with request channel requested. The signature can correspond to a selection of attributes that can be considered common to the channel request with simple variations removed. In one aspect, the signature information can correspond to a hash of the values of the set of attributes of the test channel configuration. In another aspect, the signature information can correspond to a primary hash of the values of the set of attributes of the test channel configuration and one or more secondary signatures corresponding to subsets of the attributes of the test channel configuration. In this aspect, the management service 126 can attempt to match a signature of an incoming request with the primary signature of the test channel configurations. If such a match is unsuccessful, the management service 126 can then attempt to match the signature of the incoming request with the one or more secondary signatures such that there is likely a partial match of the attributes. Although the signature is described as a hash herein, one skilled in the relevant art will appreciate that other algorithms or methodologies for generating signatures or identification data are within the scope of the present application.

At (6), the management service 126 stores the collected set of compatible computing device and signature data. As will be described below, to process channel requests, the management service 126 will select from the collected set of compatible computing devices, such as instantiating an instance of a virtual machine instance type identified with a matching signature.

Turning now to FIG. 4B, illustrative interaction for using test channel configuration information for processing incoming channel requests will be described. At (1), the management service 126 obtains a channel request to process incoming encoded video or otherwise implement transcoding functionality. Illustratively, the channel request includes or is associated with one or more channel configuration parameters. As described above, channel configuration parameters correspond to the input to the content delivery service 120 that corresponds to all the user/customer specified settings for the processing of encoded content by the content delivery service, such as in a channel request.

At (2), the management service 126 generates signature information for the channel communication request. As described above, the signature information corresponds to a representation of attributes of the channel request configuration that can be utilized to match with a signature of the test channel configuration that is associated with a set of compatible virtual machine instances identified in the processing of a test channel configuration. The signature can correspond to a selection of attributes that can be considered common to the channel request with simple variations removed. In one aspect, the signature information can correspond to a hash of the values of the set of attributes of the test channel configuration. In another aspect, the signature information can correspond to a primary hash of the values of the set of attributes of the test channel configuration and one or more secondary signatures corresponding to subsets of the attributes of the test channel configuration. In this aspect, the management service 126 can attempt to match a signature of an incoming request with the primary signature of the test channel configurations. If such a match is unsuccessful, the management service 126 can then attempt to match the signature of the incoming request with the one or more secondary signatures such that there is likely a partial match of the attributes. Although the signature is described as a hash herein, one skilled in the relevant art will appreciate that other algorithms or methodologies for generating signatures or identification data are within the scope of the present application.

At (3), the management service 126 obtains the set of test channel configurations previously processed and stored. At (4), the management service 126 determines whether the signature from the request matches one or more signatures from the set of test channel configurations. Illustratively, the management service 126 can match primary signatures and select the matching test channel configuration and the associated full set of compatible computing devices, such as virtual machine instance types. In another embodiment, the management service 126 can combine partial or secondary signature matches from two or more test channel configurations to form a super set of compatible computing devices (e.g., combining sets of identified computing devices based on partial matches based on the values in the channel request for encoding format or frame rate). Additionally, the management service 126 can optionally prioritize the set of compatible computing devices v. As described above, in one aspect, the management service 126 can sort by one or more performance metrics, such that the computing devices, such as virtual machine instances, associated with higher performance metrics are ranked or prioritized. In another aspect, the management service 126 can sort by a financial cost associated or charged by the service provider such that financial costs attributed to the instantiation and execution of virtual machine instances can be identified from lower to higher attributed costs (or vice versa). In still other aspects, the management service 126 can accept additional, alternative or supplemental sorting criteria, such as custom criteria specified by a system administrator or the like. If the set of compatible computing devices was previously prioritized or ranked, the management service 126 can omit this step or implement in a non-redundant manner.

At (5), the management service 126 selects one of the computing devices from the set of available computing devices. In one embodiment, to make the selection from multiple, available computing devices, the management service 126 can utilize additional criteria to select a computing device. The additional criteria can include information that was not utilized during the testing to qualify the virtual machine instance, such as a cost attributed to the instantiation of the virtual machine instances or a cost associated with implementing transcoding functionality. In another example, the management service 126 can utilize performance metrics to select between compatible computing devices. Still further, the management service 126 can utilize historical data such that computing devices or virtual machine instance types that have successful implemented transcoding functionality may be weighed or prioritized over computing devices or virtual machine instance types that have not historically been utilized to implement the transcoding functionality. Still further, the management service 126 can keep state data regarding a total number of computing devices or instances of virtual machines or a total cost and adjust the selection of virtual machine instances based on thresholds (e.g., selecting a virtual machine instance type that will not exceed a financial threshold or a limit as to certain types of instantiated virtual machine instances).

Illustratively if a matching signature is not found, the management service 126 can select a default computing device. For example, the management service 126 can be configured with a "generic" virtual machine instance type that may be most likely applicable to a wide ranging set of communication requests. In another example, the management service 126 can be configured to select virtual machine instances associated with higher resources/attributes to attempt to ensure compatibility. In still another example, the management service 126 can be configured to select virtual machine instances associated with lowest resources/attributes to attempt compatibility and attempt to adjust for higher resources if needed.

At (6), the management service 126 returns the selected virtual machine instance and causes the instantiation of the selected virtual machine instance with a service provider. In other embodiment, the management service 126 returns the selected physical machine and configures the selection in a way to cause the physical machine to be committed to be used with the channel request.

Figure 5:
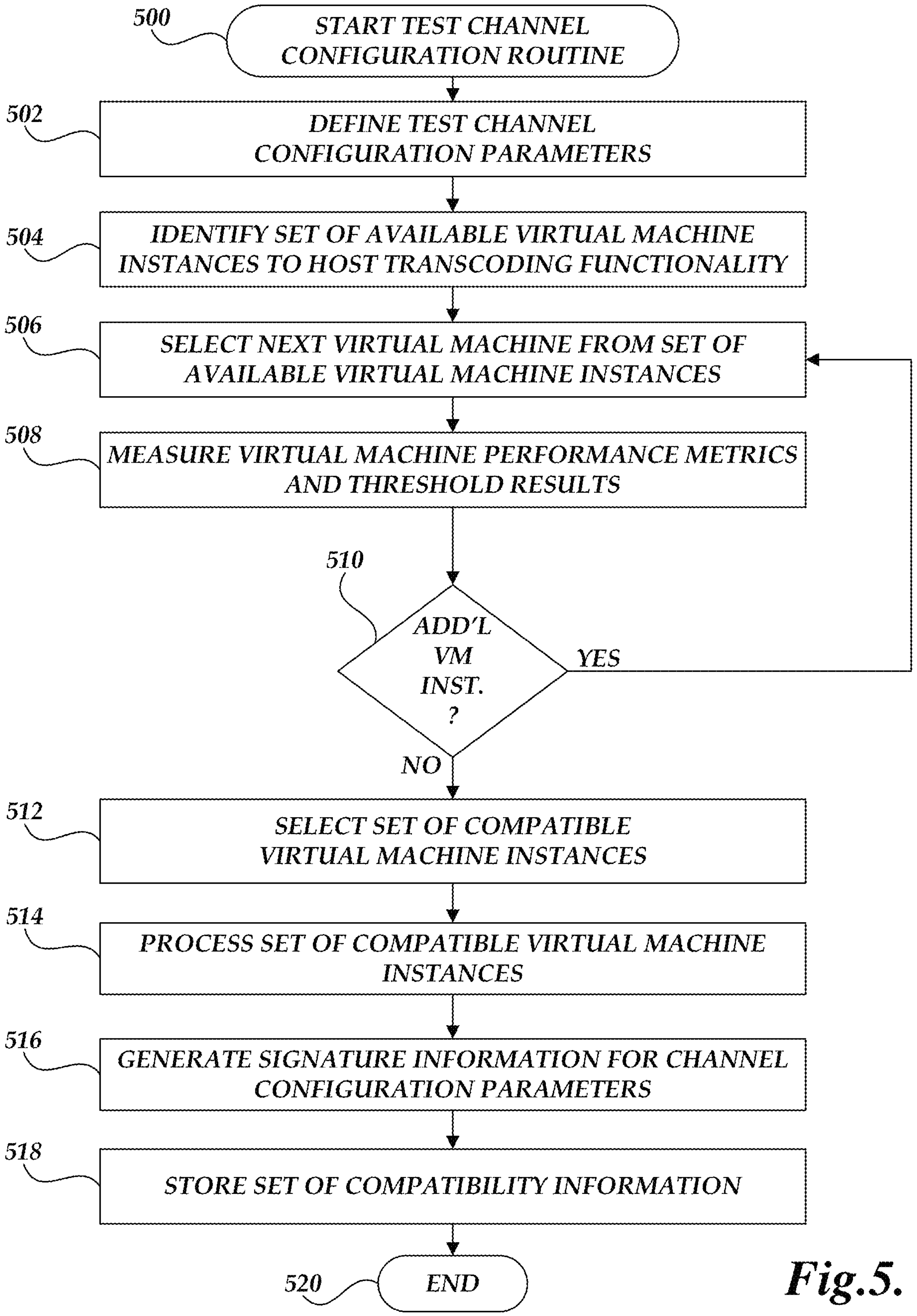
FIG. 5 is a flow diagram illustrative of a channel configuration request processing routine implemented by a content delivery service.

Turning now to FIG. 5, a routine 500 utilized by the content delivery service 120 for generating a test channel configuration will be described. Illustratively, routine 500 may be implemented by the management service 126 of the content delivery service 120 and will be described with regard to testing of virtual machine instance types. However, one skilled in the relevant art will appreciate that routine 500 is not limited to utilization with regard to virtual machine instance types or instantiated virtual machine instances. At block 502, the management service 126 defines test channel configuration parameters. As described above, the management service 126 forms a test channel configuration by utilizing a full channel request a template or base set of parameters. The full channel request can correspond to a historically processed channel request or a manually specified, full channel request. The channel configuration parameters correspond to the input to the content delivery service 120 that corresponds to all the user/customer specified settings for the processing of encoded content by the content delivery service, such as in a request to create a communication channel. As will be described, a test channel configuration corresponds to a processing of a full channel request to a set of attributes that may be characterized as affecting the implementation of the transcoding functionality by different virtual machine types or virtual machine configurations or have been adjusted in a manner specifically to elicit additional computing resource consumption during implementation of a transcoding functionality.

In one aspect, to management service 126 can remove or filter one or more channel configuration parameters form the base channel request that have not been characterized as affecting the implementation of the transcoding functionality by different virtual machine instance types. For example, the management service 126 can filter naming information or other organizational criteria that may not affect the transcoding functionality. In another example, the management service 126 can filter destination information or output processing information that will not affect the transcoding functionality. Such filtering can include parameters that may have some impact on the transcoding functionality but may be manually excluded or otherwise determined not to sufficiently impact the transcoding functionality. Additionally, in other embodiments, the management service 126 can filter or remove configuration parameters that may have a material impact on transcoding functionality but such that that the impact is considered to be independent of different virtual machine instance type. For example, the management service 126 can remove a parameter in which the performance impact is identical regardless of the virtual machine instance type that is utilized by the management service 126.

In another aspect, the management service 126 can quantize one or more values of the channel configuration parameters. Typically, one or more attributes of the channel configurations can be specified as a value in a range of possible values. For example, video resolutions values can be specified as a value in terms of a range of possible lines. Accordingly, the management service 126 can adjust such values by increasing or rounding up the value to a set value greater than the value specified in the channel configuration. With reference to the previous example, the management service 126 can increase the specified bitrate to the nearest, higher video resolution. In some embodiments, the set value may be sufficiently higher to encompass multiple embodiments/variations of the attribute. Additionally, the set value can also be limited such that the impact of performance between the set value and the original specified value does not significantly impact the measured performance metrics. The set values may be configured into default values or adjusted manually based on the tunable parameters.

In still a further aspect, the management service 126 adjust one or more of the channel configuration parameters to represent a maximum value that represents a computationally worst-case scenario in terms of potential impact on virtual machine performance metrics. For example, the management service 126 can change an encoding format and bitrate to a maximum value such that the test configuration parameters would represent that most computationally intensive formatting for transcoder functionality. In another example, the management service 126 can change a resolution parameter or a frame rate to a highest value, such as modifying video resolution to a highest supported value (e.g., 720 to 1080).

At block 502, the management service 126 identifies a set of available virtual machine instances types or configurations that are operable to host transcoding functionality. Illustratively, a service provider can provide one or more virtual machine instance types or configurations that can be defined in terms of the computing resources that are available or other characteristics that define performance, cost or implementation. In some embodiments, the set of available virtual machine instance types/configurations may be further characterized by organizational criteria, such as a "family" of virtual machine instances, in which the virtual machine instances share one or more common parameters and may only be distinguished based on differences in one or two parameters. For example, a family of virtual machine instances may have a number of overlapping parameters in terms of hardware and software configurations, and may only differ based on the number of processing units or memory size (e.g., "small," "medium," "large," etc.). The set of available virtual machine instances may be the full set of virtual machine instances provided by a service provider. Alternatively, the set of virtual machine instances may be filtered or limited, such as by cost and the like.

At block 506, the management service 126 enters into an iterative loop to collect performance metrics for the set of available virtual machine instances by selecting the next available virtual machine instance. At block 508, the management service 126 runs transcoder functionality according to the sample test configuration on the selected virtual machine instance. The management service 126 measures or obtains performance metrics for the selected virtual machine instance. Illustratively, the measured performance metrics can include, but are not limited to, a measure or characterization of CPU utilization, memory utilization, network bandwidth utilization, video quality, dropped frames, artifacts in encoding, error rates, and the like. Additionally, the management service 126 compares at least a portion of the collected performance metric information against minimum performance thresholds. Illustratively, the management service 126 can make a determination of positive or negative whether the virtual machine instance performance metrics meets or exceeds all of the performance thresholds. The management service 126 can include buffers for possible errors in measurement or may treat the thresholds as absolute. The resulting comparison can correspond to an assessment of whether the virtual machine instance is capable of hosting transcoding functionality for the test channel configuration. At decision block 510, a test is conducted to determine whether additional virtual machine instances should be teste. If so, the routine 500 returns to block 506. As previously described, although blocks 506-510 describe an iterative processing, the management service can optionally implement alternative types of processing to identify compatible virtual machine instances.

Once all the virtual machine instances types/configurations have been tested and performance information collected, at block 512, the management service 126 selects the set of virtual machine instances that are considered compatible with the test channel configuration. Illustratively, the set of virtual machine instances considered compatible with the test channel configuration can include each individual virtual machine instance type/configuration that was tested by the management service 126 and was associated with performance metrics exceeding the minimum thresholds. Additionally, in some embodiments, the set of virtual machine instances can also include family members or other virtual machine instances associated by organizational criteria. For example, for a virtual machine instance meeting or exceeding performance thresholds, all "related" virtual machine instances with higher resource attributes could also be automatically included as well (e.g., a qualification of a size "small" would automatically qualify all virtual machine sizes).

At block 514, the management service 126 can optionally sort the set of compatible virtual machine instances. In one aspect, the management service 126 can sort by one or more performance metrics, such that the virtual machine instances associated with higher performance metrics are ranked or prioritized. In another aspect, the management service 126 can sort by a financial cost associated or charged by the service provider such that the virtual machine instances can be identified from lower to higher attributed costs (or vice versa). In still other aspects, the management service 126 can accept additional, alternative or supplemental sorting criteria, such as custom criteria specified by a system administrator or the like.

At block 516, the management service 126 generates signature information for the test channel configuration. Illustratively, the signature information corresponds to a representation of attributes of the test channel configuration that can be utilized to match with request channel requested. The signature can correspond to a selection of attributes that can be considered common to the channel request with simple variations removed. In one aspect, the signature information can correspond to a hash of the values of the set of attributes of the test channel configuration. In another aspect, the signature information can correspond to a primary hash of the values of the set of attributes of the test channel configuration and one or more secondary signatures corresponding to subsets of the attributes of the test channel configuration. In this aspect, the management service 126 can attempt to match a signature of an incoming request with the primary signature of the test channel configurations. If such a match is unsuccessful, the management service 126 can then attempt to match the signature of the incoming request with the one or more secondary signatures such that there is likely a partial match of the attributes. Although the signature is described as a hash herein, one skilled in the relevant art will appreciate that other algorithms or methodologies for generating signatures or identification data are within the scope of the present application.

At block 518, the management service 126 stores and associates the collected set of compatible virtual machine instances and signature data. As described above, the management service can utilize matching signature information with a channel request to determine which virtual machine instance type is considered compatible based on the associated set of compatible virtual machine instances. At block 520, the routine 500 terminates.

Figure 6:
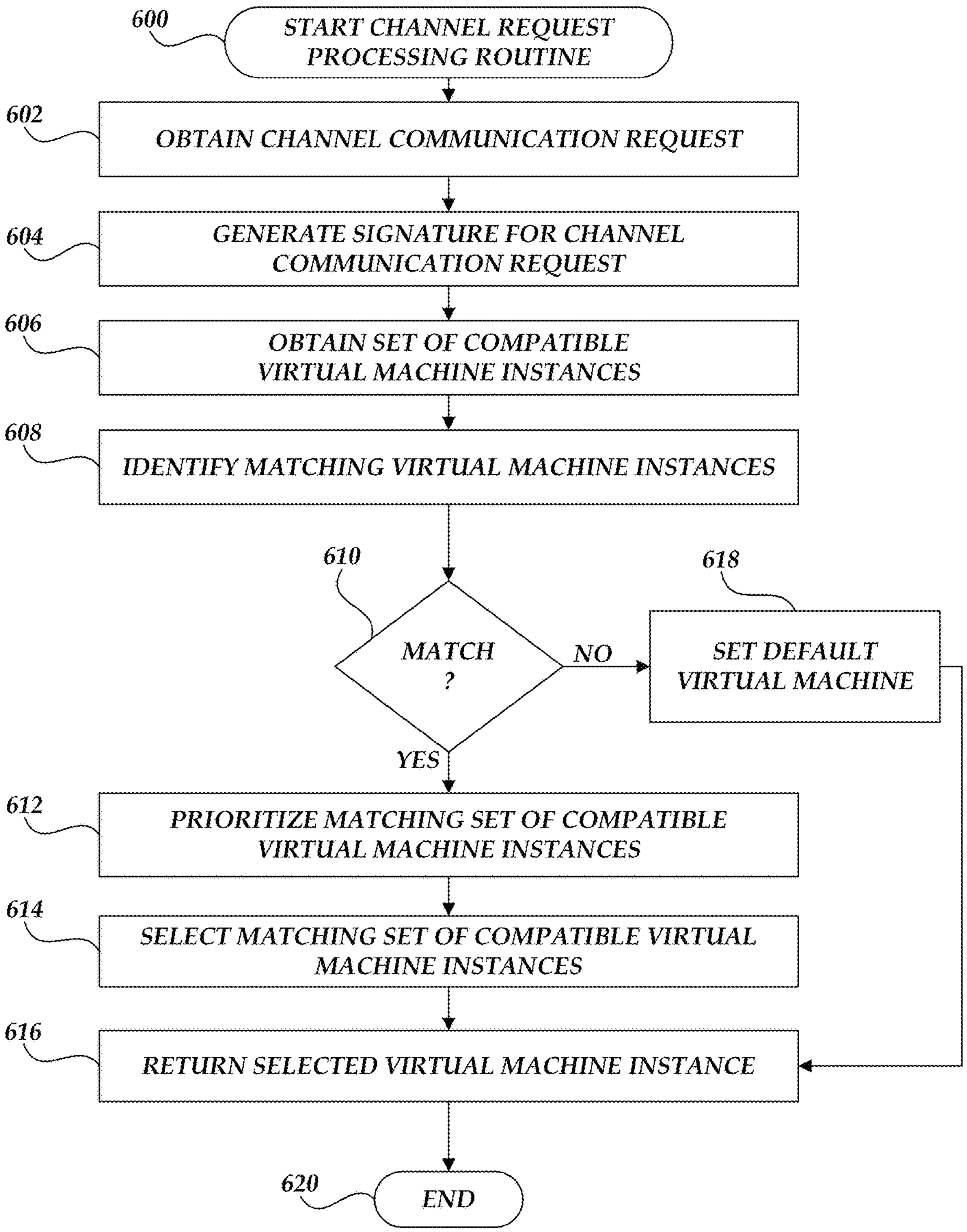
FIG. 6 is a flow diagram illustrative of a channel request processing routine implemented by a content delivery service.

Turning now to FIG. 6, a routine 600 utilized by the content delivery service 120 for using test channel configuration information for processing incoming request for a communication channel will be described. Illustratively, routine 600 may be implemented by the management service 126 of the content delivery service 120 and will be also be described with regard to instantiation of virtual machine instance types. However, one skilled in the relevant art will appreciate that routine 600 is not limited to utilization with regard to virtual machine instance types or instantiated virtual machine instances. At block 602, the management service 126 obtains a channel request to process incoming encoded video or otherwise implement transcoding functionality for identified content. The channel request includes or is associated with a set of channel configuration parameters. As described above, channel configuration parameters correspond to the input to the content delivery service 120 that corresponds to all the user/customer specified settings for the processing of encoded content by the content delivery service, such as in a request to create a communication channel.

At block 604, the management service 126 generates signature information for the channel request. As described above, the signature information corresponds to a representation of attributes of the channel request (and associated channel configuration parameters) that can be utilized to match with a set of signatures generated in the processing of a test channel configuration. The signature can correspond to a selection of attributes that can be considered common to the channel request with simple variations removed. In one aspect, the signature information can correspond to a hash of the values of the set of attributes of the test channel configuration. In another aspect, the signature information can correspond to a primary hash of the values of the set of attributes of the test channel configuration and one or more secondary signatures corresponding to subsets of the attributes of the test channel configuration. In this aspect, the management service 126 can attempt to match a signature of an incoming request with the primary signature of the test channel configurations. If such a match is unsuccessful, the management service 126 can then attempt to match the signature of the incoming request with the one or more secondary signatures such that there is likely a partial match of the attributes. Although the signature is described as a hash herein, one skilled in the relevant art will appreciate that other algorithms or methodologies for generating signatures or identification data are within the scope of the present application.

At block 606, the management service 126 obtains the set of signatures from test channel configurations previously processed and stored. At decision block 610, a test is conducted to determine whether the management service 126 can match one or more signatures. Illustratively, the management service 126 can match primary signatures and select the full set of compatible virtual machine instances that have been associated with the matching signature. In another embodiment, the management service 126 can combine partial or secondary signature matches to form a super set of compatible virtual machine instances associated with each matching signature (e.g., combining sets based on partial matches for encoding format or frame rate). If a match is made, at block 612, the management service 126 can optionally prioritize the set of compatible virtual machine instances. As described above, in one aspect, the management service 126 can sort by one or more performance metrics, such that the virtual machine instances associated with higher performance metrics are ranked or prioritized. In another aspect, the management service 126 can sort by a financial cost associated or charged by the service provider such that the virtual machine instances can be identified from lower to higher attributed costs (or vice versa). In still other aspects, the management service 126 can accept additional, alternative or supplemental sorting criteria, such as custom criteria specified by a system administrator or the like. If the set of compatible virtual machine instances was previously prioritized or ranked, the management service 126 can omit block 612 or implement in a modified manner to account for the previous ranking/prioritization.

At block 614, the management service 126 selects one of the virtual machine instance from the set of available virtual machine instances. In one embodiment, the management service 126 can utilize additional criteria to select from identified compatible virtual machine instances. The additional criteria can correspond to information that was not utilized in the generation or qualification of the virtual machine instance during the test channel configuration, such as a cost attributed to the instantiation of the virtual machine instances or a cost associated with implementing transcoding functionality. In another example, the management service 126 can utilize performance metrics to select between compatible virtual machine instances. Still further, the management service 126 can utilize historical data such that virtual machine instance types that have successful implemented transcoding functionality may be weighed or prioritized over virtual machine instance types that have not historically been utilized to implement the transcoding functionality. Still further, the management service 126 can keep state data regarding a total number of instances of virtual machines or a total cost and adjust the selection of virtual machine instances based on thresholds (e.g., selecting a virtual machine instance type that will not exceed a financial threshold or a limit as to certain types of instantiated virtual machine instances).

Referring back to decision block 610, if a matching signature is not found, the management service 126 can select a default virtual machine instance. For example, the management service 126 can be configured with a "generic" virtual machine instance type that may be most likely applicable to a wide ranging set of communication requests. In another example, the management service 126 can be configured to select virtual machine instances associated with higher resources/attributes to attempt to ensure compatibility. In still another example, the management service 126 can be configured to select virtual machine instances associated with lowest resources/attributes to attempt compatibility and attempt to adjust for higher resources if needed.

At block 616, the management service 126 returns the selected virtual machine instance and causes the instantiation of the selected virtual machine instance with a service provider. At block 620, the routine 600 terminates.

In additional embodiments, the management service 126 can implement routines 500 or 600 to qualify new virtual machine instances provided by a service provider or to update a recommendation for a specific virtual machine instance type/configuration. Additionally, in still further embodiments, the management service 126 can process the performance metric information and utilize a feedback channel to suggest adjustments in one or more virtual machine parameters to facilitate the additional qualification of one or more virtual machine instances or to adjust parameters not required to qualify a virtual machine instance.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method to manage content-aware processing of encoded content comprising:

obtaining, from a content provider, a channel request to implement content-aware transcoding functionality for incoming encoded content;

generating a signature associated with the channel request to implement the content-aware transcoding functionality for the incoming encoded content from the content provider, wherein the signature associated with the channel request represents a modified channel request for transcoding and wherein the signature associated with the channel request includes an adjusted value corresponding to a change from an original transcoding-configuration setting to a configuration setting characterized as corresponding to a most computationally intensive implementation of the content-aware transcoding functionality, the configuration setting comprising at least one of a resolution parameter, a frame rate, an encoding codec, or an encoding file type;

determining that the signature associated with the channel request matches a signature associated with an identified test channel configuration from a set of test channel configurations, wherein each individual test channel configuration of the set of test channel configurations identifies one or more computing devices for implementing the content-aware transcoding functionality;

identifying a computing device for implementing the channel request, the identified computing device associated with the identified test channel configuration; and causing execution of the request to implement content-aware transcoding functionality for the incoming encoded content on the identified computing device.

2. The computer-implemented method of claim 1, wherein identifying the computing device comprises selecting the computing device from a plurality of candidate computing devices individually associated with the signature associated with the channel request.

3. The computer-implemented method of claim 1, wherein the computing device is associated with the signature associated with the channel request based at least in part on a determination that a performance metric obtained from the computing device during implementation of transcoding functionality according to the identified test channel configuration satisfies a threshold.

4. The computer-implemented method of claim 1, wherein the computing device comprises a virtual computing device.

5. The computer-implemented method of claim 1, wherein the identified test channel configuration comprises a test channel configured according to the configuration setting.

6. The computer-implemented method of claim 1, wherein the original transcoding-configuration setting comprises an encoding format and bitrate.

7. A system to manage content-aware processing of encoded content, the system comprising:

a data store configured to store computer-executable instructions; and a processor in communication with the data store, wherein the computer-executable instructions, when executed by the processor, configure the processor to perform operations including:

obtaining a request to implement content-aware transcoding functionality for incoming encoded content;

generating a signature associated with the request, wherein the signature associated with the request represents a channel request for transcoding and wherein the signature associated with the request includes an adjusted value corresponding to a change from an original transcoding-configuration setting to a configuration setting characterized as corresponding to a most computationally intensive implementation of the content-aware transcoding functionality, the configuration setting comprising at least one of a resolution parameter, a frame rate, an encoding codec, or an encoding file type;

determining that the signature associated with the request matches a signature associated with a first test channel configuration of a plurality of test channel configurations, wherein the first test channel configuration is associated with a set of computing devices for implementing the content-aware transcoding functionality;

selecting a first computing device from the set of computing devices associated with the first test channel configuration; and causing the first computing device to implement the content-aware transcoding functionality for the incoming encoded content.

8. The system of claim 7, wherein the data store is configured to store further computer-executable instructions that, when executed by the processor, configure the processor to perform further operations including:

obtaining one or more performance metrics associated with the first computing device implementing the content-aware transcoding functionality in accordance with the first test channel configuration; and responsive to determining that individual performance metrics of the one or more performance metrics satisfy minimum performance thresholds, associating the first test channel configuration with the set of computing devices.

9. The system of claim 7, wherein selecting the first computing device from the set of computing devices associated with the first test channel configuration is based at least in part on one or more of performance metrics, historical data regarding implementation of transcoding functionality, cost, or total number of instantiated virtual machine instances of a particular type.

10. The system of claim 7, wherein selecting the first computing device from the set of computing devices is based at least in part on a prioritization of the set of computing devices.

11. The system of claim 7, wherein the data store is configured to store further computer-executable instructions that, when executed by the processor, configure the processor to perform further operations including prioritizing the set of computing devices.

12. The system of claim 7, wherein the signature associated with the first test channel configuration comprises a primary signature.

13. The system of claim 7, wherein the set of computing devices includes a virtual machine instance.

14. The system of claim 13, wherein the data store is configured to store further computer-executable instructions that, when executed by the processor, configure the processor to instantiate the virtual machine instance.

15. The system of claim 7, wherein the original transcoding-configuration setting comprises a resolution parameter and frame rate.

16. A computer-implemented method comprising:

generating a signature based at least in part on a request to implement transcoding functionality for incoming encoded content, wherein the signature based at least in part on the request represents a channel request for transcoding and wherein the signature based at least in part on the request includes an adjusted value corresponding to a change from an original transcoding-configuration setting to a configuration setting characterized as corresponding to a most computationally intensive implementation of the transcoding functionality, the configuration setting comprising at least one of a resolution parameter, a frame rate, an encoding codec, or an encoding file type;

determining that the signature based at least in part on the request corresponds to a signature associated with a first test channel configuration of a plurality of test channel configurations, wherein the first test channel configuration is associated with a set of computing devices for implementing content-aware transcoding functionality; and causing a first computing device of the set of computing devices to implement the transcoding functionality for the incoming encoded content.

17. The computer-implemented method of claim 16 wherein the first computing device comprises a computing device in the set of computing devices with a lowest quantity of a first computing resource.

18. The computer-implemented method of claim 16, wherein the request to implement transcoding functionality for the incoming encoded content comprises a request to implement content-aware transcoding functionality, and wherein the content-aware transcoding functionality comprises transcoding functionality implemented by a computing device selected based at least in part on an attribute of the incoming encoded content.

19. The computer-implemented method of claim 16, wherein each computing device in the set of computing devices meets or exceeds a base hardware or software configuration.

20. The computer-implemented method of claim 19, wherein the base hardware or software configuration is associated with the signature based at least in part on the request.

21. The computer-implemented method of claim 16, wherein the configuration setting is dynamically determined.

22. The computer-implemented method of claim 16, wherein the configuration setting is pre-determined.

* * * * *